United States Patent
Dorn

(10) Patent No.: US 12,307,018 B2
(45) Date of Patent: May 20, 2025

(54) HAND GESTURE MAGNITUDE ANALYSIS AND GEARING FOR COMMUNICATING CONTEXT-CORRECT COMMUNICATION

(71) Applicant: Sony Interactive Entertainment Inc., Tokyo (JP)

(72) Inventor: Victoria Dorn, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 100 days.

(21) Appl. No.: 18/295,129

(22) Filed: Apr. 3, 2023

(65) Prior Publication Data
US 2024/0329747 A1 Oct. 3, 2024

(51) Int. Cl.
G06F 3/01 (2006.01)
G06V 40/16 (2022.01)
G06V 40/20 (2022.01)
A63F 13/213 (2014.01)

(52) U.S. Cl.
CPC .............. *G06F 3/017* (2013.01); *G06F 3/012* (2013.01); *G06V 40/171* (2022.01); *G06V 40/176* (2022.01); *G06V 40/28* (2022.01); *A63F 13/213* (2014.09)

(58) Field of Classification Search
CPC .......... G06F 3/017; G06F 3/012; G06F 3/011; G06V 40/171; G06V 40/176; G06V 40/28; G06V 40/20; A63F 13/213; A63F 13/537; A63F 13/87; A63F 13/218; A63F 13/56; A63F 13/428; G06T 7/292; H04N 7/157
See application file for complete search history.

(56) References Cited

U.S. PATENT DOCUMENTS

| | | |
|---|---|---|
| 2011/0007142 A1 | 1/2011 | Perez et al. |
| 2011/0221755 A1 | 9/2011 | Geisner et al. |
| 2012/0309535 A1 | 12/2012 | Langridge et al. |
| 2015/0138063 A1* | 5/2015 | Cao ........................ G06V 40/10 345/156 |
| 2015/0309263 A2 | 10/2015 | Abovitz et al. |
| 2015/0325029 A1* | 11/2015 | Li .......................... G06T 1/0007 382/103 |
| 2018/0001198 A1* | 1/2018 | Frappiea ............. A63F 13/2145 |
| 2018/0093185 A1 | 4/2018 | Black et al. |
| 2019/0346928 A1* | 11/2019 | Shahmohammadi ....................... H04B 13/005 |

OTHER PUBLICATIONS

Intl Search Report and The Written Opinion, PCT/US2024/020818, Dated Jul. 15, 2024, Total 13 pages.

* cited by examiner

*Primary Examiner* — Temesghen Ghebretinsae
*Assistant Examiner* — Ivelisse Martinez Quiles
(74) *Attorney, Agent, or Firm* — Fish & Richardson P.C.

(57) ABSTRACT

Methods and system for interpreting gestures provided by a user include capturing images of gestures provided by the user during user's interaction in metaverse and analyzing the images to identify attributes of the gestures captured in the images. The attributes of the gesture are translated into input, based on context of interaction of the user in the metaverse and communicating the input to the metaverse for applying to the interaction.

19 Claims, 6 Drawing Sheets

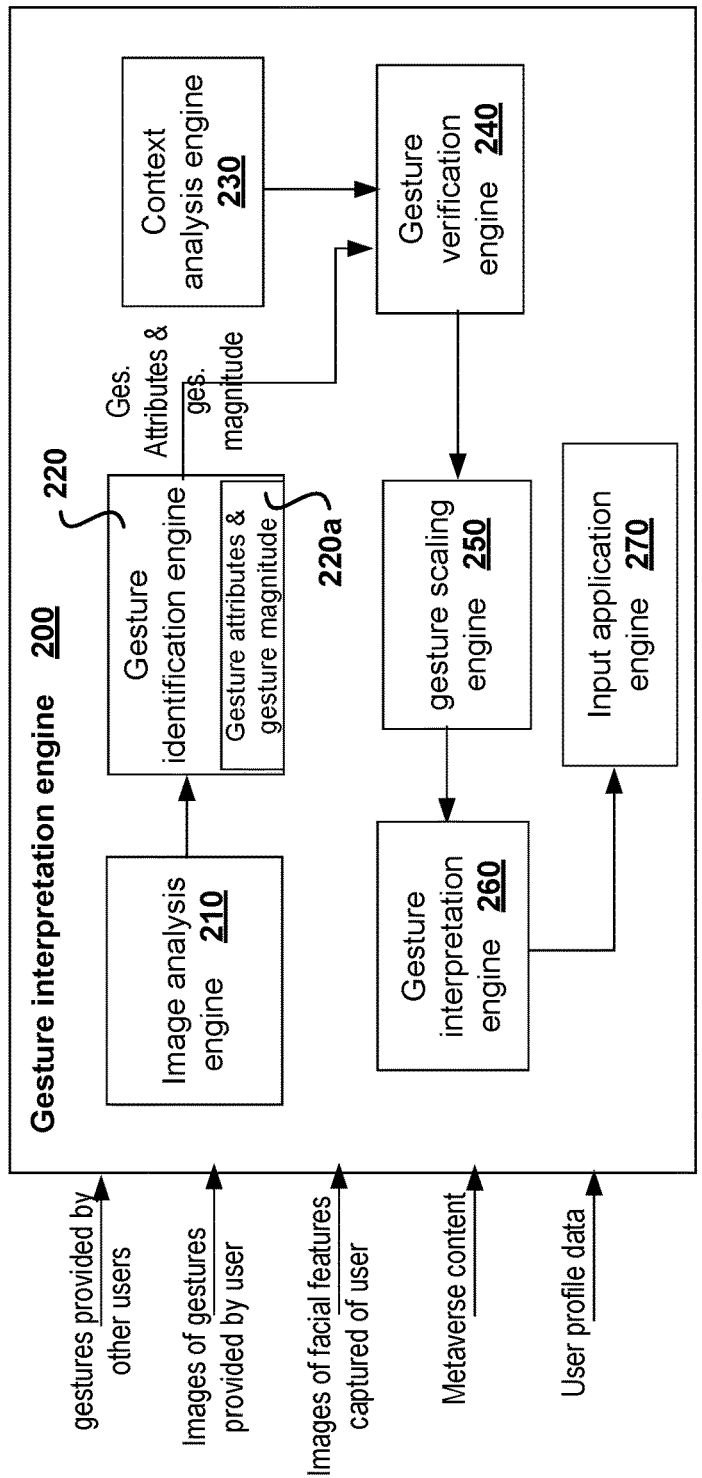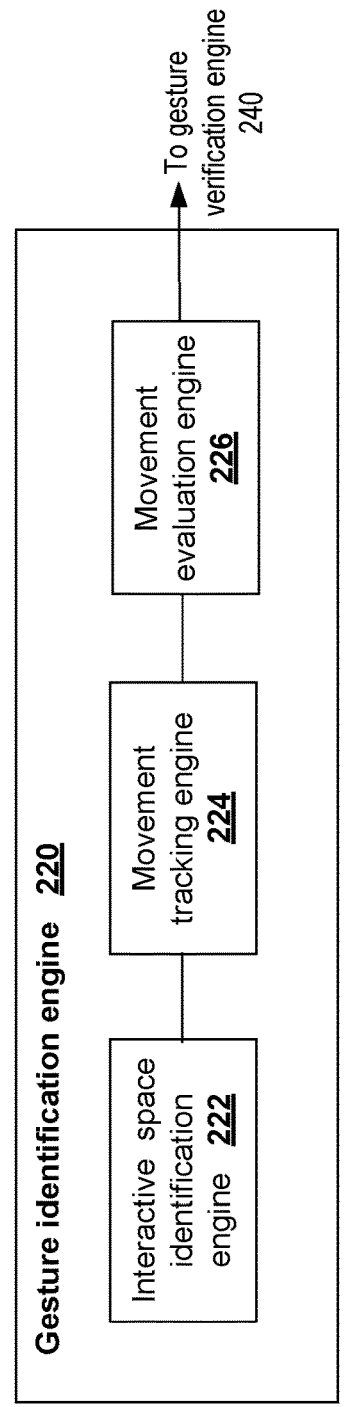

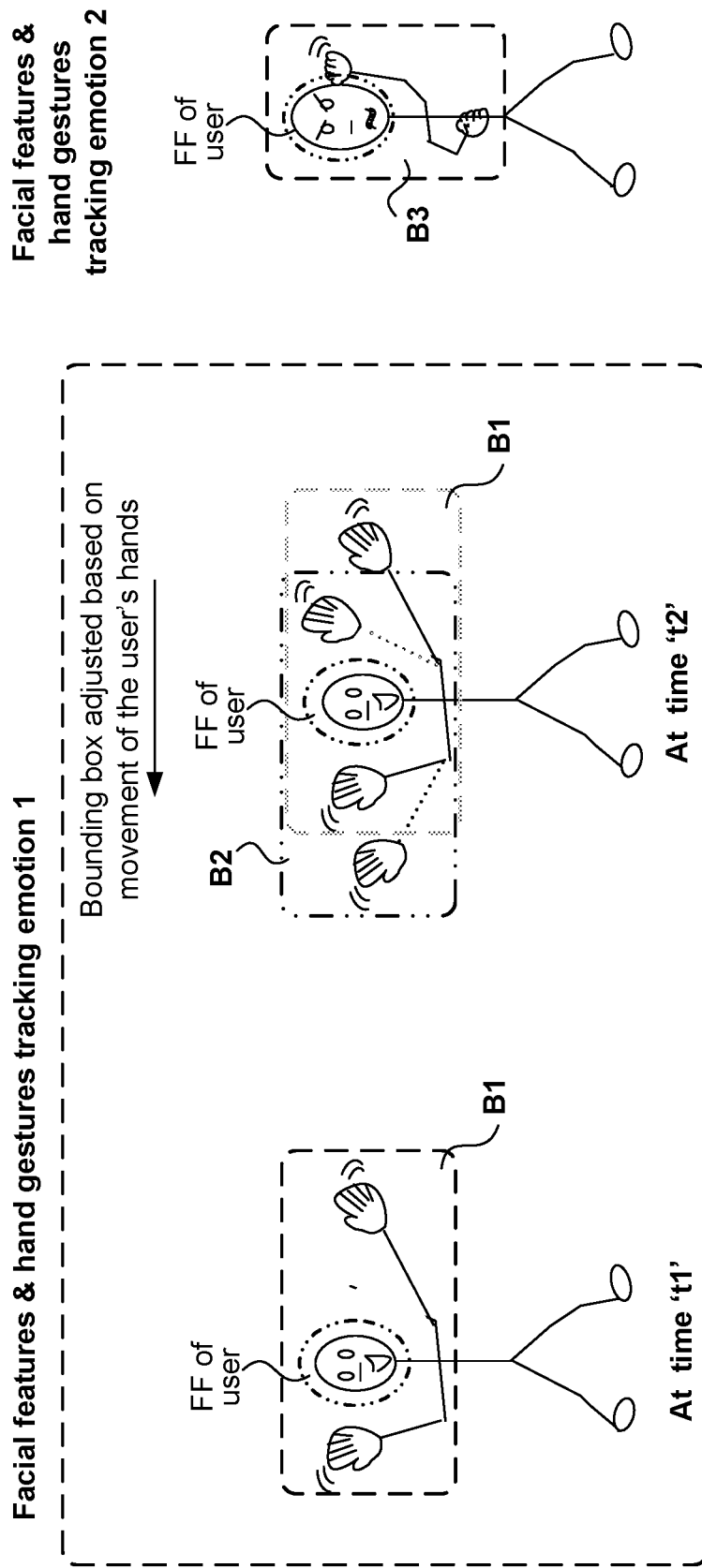

HAND GESTURE MAGNITUDE ANALYSIS AND GEARING FOR COMMUNICATING CONTEXT-CORRECT COMMUNICATION

BACKGROUND OF THE INVENTION

1. Field of the Invention

The present disclosure relates to tracking gestures of a user interacting with content in a metaverse and interpreting the gesture to generate input for applying to the content.

2. Description of the Related Art

With the growth of the Internet, users are able to interact with various content available in digital space. Over time, more and more content is made available in the digital space, and the users are able to access and interact with the content from different devices. For instance, users are able to access the content from desktop computers, laptop computers, tablet computers, mobile devices, such as mobile phones, head mounted displays, smart glasses, etc. Similarly, users are able to provide their inputs via various input devices, such as keyboards, mouse, touch pad, touch screens, scanners, wearable and/or hand-held devices, such as controllers, smart gloves, wearable clothing, smart pens/other smart writing instruments, microphones (for audio inputs), etc. Users are able to provide different types of inputs, such as key strokes, button presses, hover actions, taps, swipes, touch inputs, etc.

With the rising popularity of virtual reality, augmented reality, and metaverse, the way users interact with one another and with content presented in the metaverse continues to evolve. The term "metaverse" is a portmanteau of the prefix "meta" (meaning beyond) and the "universe". The metaverse, in the simplest form, can be understood to be a virtual-reality space in which users can interact with a computer-generated environment and with other users. Simply put, the metaverse is defined using an augmented reality approach by integrating the physical environment with the digital world (i.e., virtual environment), where the real-world is overlaid with virtual reality objects. Users can interact in the metaverse in much the same way as interacting with a video game or a virtual or augmented reality content.

As content presentation and sharing continue to evolve, the ways to interact with the content also continue to evolve.

It is in this context that embodiments of the invention arise.

SUMMARY OF THE INVENTION

Implementations of the present disclosure relate to systems and methods for tracking gestures of a user as the user is interacting in metaverse (or virtual reality or augmented reality space) and use the gestures to identify gesture magnitude and other attributes of the gestures. The gesture magnitude is interpreted in a context of communication of the user in the metaverse to define input. The gesture magnitude is additionally used to generate a communication signal to convey urgency or importance of the gestures. If the gesture magnitude of the user's gestures is large, the input defined from the gestures is augmented to convey the urgency or importance of the communication expressed via or accompanying the gestures. Similarly, if the gesture magnitude is small, the input is attenuated to avoid distraction and/or to convey appropriate message for the communication between the user and the metaverse. To avoid falsely augmenting or attenuating the communication, the gestures of the user are tracked over time and use the tracked gestures to learn the attributes and the gesture magnitude of the gestures typically expressed by the user for various context of interaction.

Correctly interpreting the attributes including gesture magnitude and other details of the gestures are useful as such details correctly convey the extent to which the content has to be adjusted or the mood of the user when communicating with other users. The gesture magnitude captures the speed, the velocity, the physical interaction space the user is occupying when performing the gestures, extent of space to consider for capturing the gestures, etc. In addition to capturing the gestures to define the attributes of the gestures and the gesture magnitude, the system also captures the facial features of the user as the user is providing the gestures. The facial features are used to determine the user's expressions. The user's expressions can be used to further validate the gesture magnitude. For instance, the system can determine if the amount of excitement conveyed by the user's expressions correlates with the gestures and the gesture magnitude. The system can also determine if the gist of the user's expression corresponds with the context of interaction, etc.

The interpreted gesture magnitude and other gesture attributes are used to define input that is conveyed to the metaverse for applying to content or for communicating with other users or for adjusting the expressions and gestures of an avatar representing the user in the metaverse. The input is augmented or attenuated in accordance to the urgency or importance conveyed by the gestures so that the input, when applied in the metaverse, conveys the urgency or importance appropriately.

In one implementation, a method for interpreting gestures provided by a user is disclosed. The method includes capturing images of gestures of the user as the user is interacting in a metaverse. The images are capturing using a plurality of sensors distributed within a physical environment where the user is operating. The images of the gestures are analyzed to identify attributes of the gestures captured in the images. The attributes of the gestures are evaluated to identify at least a gesture magnitude. The attributes of the gestures including the gesture magnitude are translated, based on context of interaction of the user in the metaverse, to define an input from the user. The input is communicated to the metaverse for applying to content related to the interaction, wherein the input is interpreted in the context of the interaction of the user in the metaverse.

In an alternate implementation, a method for interpreting gestures provided by a user is disclosed. The method includes tracking movement of body parts of the user. The tracking is done by capturing images of the body parts of the user using a plurality of sensors distributes within a physical environment where the user is operating. The images are analyzed to identify attributes of gestures captured within. The attributes are evaluated to identify at least a gesture magnitude. The attributes of the gestures including the gesture magnitude are translated, based on the context of interaction of the user in a metaverse, to define an input from the user. The gesture magnitude is evaluated in the context of the interaction of the user in the metaverse to define a communication signal for conveying an importance of the input. The input is communicated with the communication signal for applying in the metaverse. The input is interpreted in the context of the interaction of the user and applied in accordance to the importance conveyed by the communication signal.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

FIG. 2 illustrates a simplified block diagram of a gesture interpretation engine used to interpret the gestures of the user to determine gesture attributes and gesture magnitude for applying as input to a metaverse, in accordance with one implementation.

FIG. 2A illustrates a simplified block diagram of a gesture identification engine of the gesture interpretation engine of FIG. 2, in accordance with an alternate implementation.

FIGS. 3A and 3B illustrates images of gestures performed by a user and images of facial features as the user is performing the gestures, wherein the images of facial features are used to validate the gestures, in accordance with one implementation.

FIG. 3C illustrates an image capturing alternate gesture performed by a user and using the images of facial features to validate the user expressing a different emotion than what was captured in FIGS. 3A and 3B, in accordance with alternate implementation.

DETAILED DESCRIPTION

Figure 1:
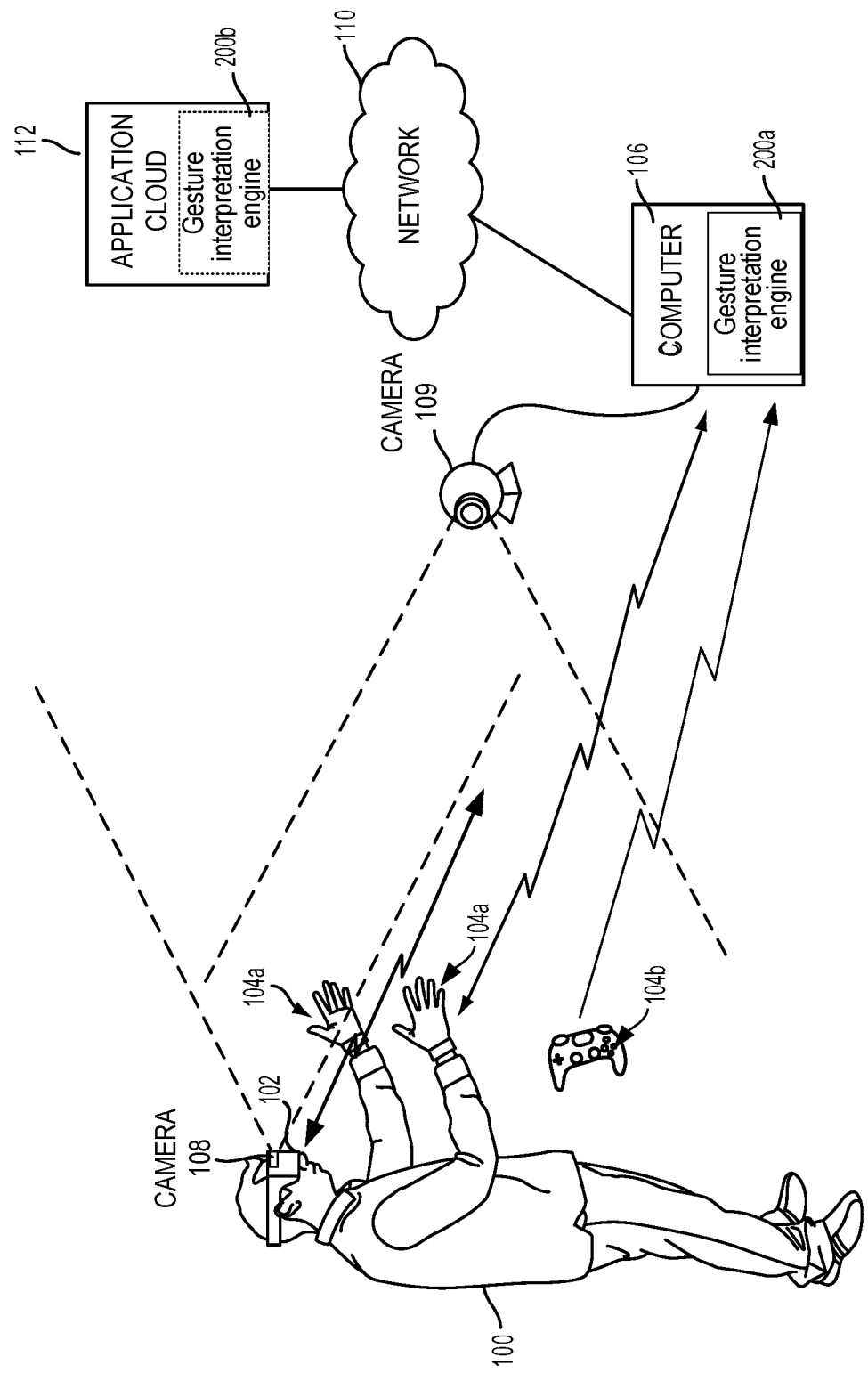
FIG. 1 represents a simplified block diagram of a system that includes a wearable device worn by a user as the user is interacting with content provided by a computer, in accordance with one implementation.

Systems and method for adjusting rendering attributes of content presented to a user at a client device are described. It should be noted that various implementations of the present disclosure are practiced without some or all of the specific details. In other instances, well known process operations have not been described in detail in order not to unnecessarily obscure various embodiments of the present disclosure.

The various implementations described herein allow an gesture interpretation engine executing on a server computing system to monitor movements of body parts of a user as the user is interacting in a metaverse using images of the movements captured by a plurality of sensors and use the images to identify gestures performed by the user. The gestures provided during current interaction (i.e., current gestures) are analyzed to identify gesture attributes. The gesture attributes are evaluated to determine gesture magnitude. The attributes obtained from the analysis of the gestures of the user are translated, based on context of interaction of the user in the metaverse, to generate an input for applying in the metaverse. The interaction of the user in the metaverse can be with an interactive application, such as a video game, and the inputs can be game inputs from the user or feedback about gameplay of a player or interaction of another user. Alternately, the interaction of the user in the metaverse can be part of a conversation held by the user with another user either via social media application or a message application or a chat application rendered alongside video game, and the inputs translated from the gestures of the user can be used to convey a sense of urgency or importance of the interaction. In some instances, the sense of urgency conveyed by current gestures may relate to other inputs provided by the user so that the other inputs communicated to the metaverse can be applied with the sense of urgency conveyed by the current gestures. In alternate instances, the gestures provided by the user can be instructions to a second user to perform certain activity in the metaverse and, in some cases, perform it with a sense of urgency (e.g., move in or turn toward a particular direction, or move fast or in a specific manner, etc.).

In some instances, the input derived from the gestures provided by the user can be used to adjust corresponding gestures and expressions of an avatar used to represent the user in the metaverse. The input of the user can be scaled so that the gestures and expressions applied to the avatar of the user correctly reflect the mood of the user, or blend with the moods of other users with whom the user is interacting with, or are toned so as to not be over-exaggerated or overly-muted. Additionally or alternatively, the scaling of the input of the user can be done so that the exaggerated gestures and expressions of a first user can be interpreted in relation to muted gestures and expressions of a second user. The amount of scaling can be determined based on the amount of exaggeration (or muted) expressed by the user in their gestures. In some instances, the amount of scaling is done based on context of the interaction and/or the environment in which the user is interacting with in the metaverse (e.g., excited interaction with friends vs. subdued interaction with family, or vice versa) so that the adjustment can blend with the gestures and expressions of the other users within the metaverse. To determine the amount of scaling that has to be done to the gestures of the user, the current gestures for the context are compared against the gesture style of the user for the same context. If a match occurs, then no scaling is done, otherwise, the gestures are scaled and the amount of scaling is based on amount of deviation of the current gestures from the gesture style recorded for the user. The scaling is done so that when the details of the inputs are applied in the metaverse, the inputs are not exaggerated but easily blend with the remaining content. For example, the input can be applied in the metaverse by adjusting the expressions and gestures of the avatar of the user to convey the expression and gestures provided by the user in the physical world. The gestures applied to the avatar of the user are the scaled version (if the gestures were exaggerated) so that the gestures and expressions on the avatar of the user blend with or are comparable to the gestures of the other users. In some implementations, the scaling is done in accordance to identity of other users present in the metaverse where the user is interacting so that the input when applied to the avatar of the user, are at the same scale of exaggeration as that expressed by the avatars of the other users. Capturing and interpreting the gestures of the user provide additional ways to provide input and validate interaction in the metaverse.

It should be noted that throughout the application, "metaverse" is used to implement the various embodiments described herein. The metaverse can be defined as a virtual realm, wherein a network of virtual worlds is interconnected with each of the virtual worlds being managed independently. The metaverse can be accessed through digital avatars using different technologies, such as augmented reality, virtual reality, or mixed reality. Virtual objects used in the metaverse can be tracked using blockchain technology. Interactions in the metaverse adopt the social media concepts. The metaverse thus is defined to create an environment that combines the physical world with the virtual world to allow multimodal interactions with virtual world and real people. The various embodiments and implementations described herein can also be extended to interaction of the user in the immersive virtual reality as well as augmented reality.

With the general understanding of the disclosure, specific implementations of providing assistance to the user will now be described in greater detail with reference to the various figures. It should be noted that various implementations of the present disclosure can be practiced without some or all of the specific details. In other instances, well known process operations have not been described in detail in order not to unnecessarily obscure various embodiments of the present disclosure.

FIG. 1 illustrates a simplified block diagram of an example system in which different devices are used to capture images of gestures provided by a user during interaction with a metaverse and to analyze the gestures to define input for applying in the metaverse. The user can interact with the metaverse (or virtual environment or augmented reality environment) using a wearable computing device or a computer, such as a desktop or laptop. In the example system shown in FIG. 1, a user 100 is shown wearing a wearable device (e.g., head mounted display (HMD)) 102. The HMD 102 is worn in a manner similar to glasses, goggles, or a helmet, and is configured to allow the user to interact within the metaverse. In an alternate implementation, in place of the HMD 102, the user 100 may be wearing a pair of smart eyeglasses with a display screen used for interacting with the metaverse, wherein the pair of smart eyeglasses allow the user to experience the real-world environment as well as augmented reality content. The user 100 may be interacting with an interactive application, such as a video game, executing in the metaverse or interacting with another user or performing certain actions in the metaverse. The HMD 102 provides a very immersive experience to the user by virtue of its provision of display mechanisms in close proximity to the user's eyes. The HMD 102 and the pair of eyeglasses can provide display regions to each of the user's eyes which occupy large portions or even the entirety of the field of view of the user. Optics provided in the HMD 102 enable the user to view the content rendered in close proximity to the user's eyes. The optics takes into consideration the visual characteristics of the user when presenting the content to the user.

In one embodiment, the HMD 102 is connected to a computer. The computer may be a local computer 106 (e.g., gaming console) or a computer that is part of an application cloud 112 that is located remote to the HMD 102. As a result, the connection between the HMD 102 and the computer may be wired or wireless. The computer (106/or part of cloud 112) can be any general or special purpose computer known in the art, including but not limited to, a gaming console, personal computer, laptop, tablet computer, mobile device, cellular phone, tablet, thin client, part of a set-top box, media streaming device, virtual computer, remote server computer, etc. With regards to remote server computer (i.e., part of cloud 112), the server computer may be a cloud server within a data center of an application cloud system. The data center includes a plurality of servers that provide the necessary resources to host one or more interactive applications that are part of the metaverse. These interactive applications provide the content to the HMD 102 or other computer/computing device for rendering. One or more of the interactive applications may be distributed applications that can be instantiated on one or more cloud servers within one data center or distributed across multiple data centers, and when instantiated on a plurality of cloud servers, the data of each of the interactive applications is synchronized across the plurality of cloud servers. In one embodiment, the interactive application may be a video game application (i.e., virtual reality (VR) application) or an augmented/mixed reality (AR) application, and the computer is configured to execute an instance of the video game application or the AR application, and output the video and audio data from the video game application or the AR application for rendering on a display screen associated with the HMD 102. In another implementation, the server may be configured to manage one or more virtual machines that is capable of executing an instance of the interactive application (e.g., AR application or video game application) and provide the content for rendering, in real-time or delayed time.

Alternately, the server may include a plurality of consoles and an instance of the interactive application may be accessed from one or more consoles (e.g., game consoles). The consoles may be independent consoles or may be rack-mounted server or a blade server. The blade server, in turn, may include a plurality of server blades with each blade having required circuitry and resources for instantiating a single instance of the video game application, for example, to generate the game content data stream. Other types of cloud servers, including other forms of blade server may also be engaged for executing an instance of the interactive application (e.g., video game application) that generates the content of the interactive application (e.g., game content data stream) for the user to interact within the metaverse. Alternately, the interactive application may be a chat application or a social media application or any other application that can receive interactions from the user and share it with other users. In some implementations, the gestures of the user can be used to adjust an avatar (e.g., expressions and gestures of the avatar) representing the user in the metaverse or share content via the avatar of the user with avatars of other users present in the metaverse or can be in the form of a reaction to content or comment from or about other users, etc. The interactions between the user and other users can be about content presented in the metaverse, or part of a conversation related to content or other users, or can be to provide additional information related to content or other users.

Gestures provided by the user during their interaction with the metaverse are captured using image capturing devices, such as camera 108 disposed on the outside surface of the HMD 102 or on the outside surface of other devices, such as the computer 106, the controller 104*b*, etc., one or more external cameras (109) that are disposed outside of the HMD 102 and computer 106 and within the physical environment, internal cameras (cameras disposed on inside surfaces of the HMD 102) (not shown), etc. The images capturing the finger gestures are used to identify the location, position, orientation, and/or movements of the user 100, the HMD 102, the glove interface object 104*a*, the controller 104*b*, and/or other input devices.

The controller 104*b* can be a single-handed controller (i.e., a controller that can be operated using a single hand of a user) or a two-handed controller (i.e., a controller that can be operated using both hands of the user). The glove interface object 104*a*, the controller 104*b* and other wearable and input devices can be tracked by tracking visual indicators, such as lights, tracking shapes, etc., associated with or disposed on such devices, to determine their respective location and orientation. Additionally or alternately, the various input devices and wearable devices (e.g., HMD 102, smart eyeglasses, glove interface object 104*a*, controller 104*b*, etc.,) can be tracked using embedded sensors.

The embedded sensors disposed in the various input and wearable devices worn and/or operated by the user can be further used to track and capture data pertaining to the finger gestures, facial features, and movement of the user in the physical environment. The data captured by the sensors and the image capturing devices can be used to determine the location and orientation of the HMD 102, glove interface object 104*a*, controller 104*b*, etc., and that of the user including movement of the facial features and the fingers of the user as the user operates the glove interface object 104*a*, holds and operates the controller 104*b*. From the details of the data captured by the sensors and image capturing devices, finer details related to the movement of the body parts of the user can be determined. For example, the finer details that can be identified from the captured data can include identity of the specific fingers and position of the fingers of the user wearing the glove interface object 104*a*, identity of the fingers used to hold the controller, pressure applied by each finger to hold the controller, identity of the fingers used to provide inputs using the controls on the controller, pressure applied when providing the inputs, position and orientation of the user in the physical environment when interacting in the metaverse, etc. The details from the finger gestures and facial features can be interpreted to define inputs for applying to the metaverse to control, maneuver, interact with, participate in the virtual reality space included in the metaverse, and/or to interact with other users present in the metaverse.

In addition to the camera 108 and other image capturing devices, one or more microphones disposed on the HMD 102, the controller 104*b*, the computer 106, and in other locations within the physical environment can be used to capture sound from the interactive environment. Sound captured by the one or more microphones may be processed to identify the location of a sound source (e.g., audio produced by the user, other users, interactive application, or other sound sources). The sound captured by the microphones in the identified location can be selectively filtered, utilized or processed to the exclusion of other sounds not from the identified location. For example, the audio produced by the user can be selectively filtered and used to validate the gestures. The filtered audio may also be provided as input to the metaverse.

In addition to capturing the finger gestures, the image capturing devices and the sensors distributed on the various devices and in the physical environment are also used to capture images of facial features and details of changes in the facial features of the user as the user is interacting with the metaverse. The facial features of the user are used to validate the finger gestures captured by the image capturing devices. The images of the finger gestures and facial features are used to identify the location, position, orientation, and/or movements of the user 100, the HMD 102, the glove interface object 104*a*, the controller 104*b* and/or other input devices, in addition to the real-world objects disposed in the physical environment in which the user is operating. Details of the finger gestures and the facial features are forwarded to a client-side gesture interpretation engine 200*a* that is executing on the computer 106 and/or to a server-side gesture interpretation engine 200*b* executing on a server of the application cloud 112.

The computer 106, in some embodiments, functions as a thin client in communication over a network 110 with the server computing device on the application cloud 112 and the cloud-side gesture interpretation engine 200*b* executing on the server is used to process the gesture related data forwarded by the computer 106. The server computing device (simply referred to henceforth as "server") can also be configured to execute one or more interactive applications or augmented reality applications that are accessible within the metaverse. The interactive application can be a video game application selected for game play by the user 100. One or more servers of the application cloud 112 can be engaged to maintain and execute an instance of the video game using the processor of the respective server or instantiate the video game on the computer 106. For example, the computer 106 may be a local network device, such as a router, that does not otherwise perform finger gestures and/or video game processing, but which facilitates passage of network traffic.

In one embodiment, the HMD 102, glove interface object 104*a*, controller 104*b*, and image capturing devices, such as camera 108, external camera 109, etc., may themselves be networked devices that independently and directly connect to the network 110 to communicate the gestures related data captured by the plurality of sensors and image capturing devices to the server at the application cloud 112. The connections to the network by the HMD 102, glove interface object 104*a*, controller 104*b*, and camera 108 may be wired or wireless. Some of the sensors used to capture data pertaining to the finger gestures include inertial measurement unit (IMU) sensors, such as accelerometers, magnetometers, gyroscopes, global positioning system tracker, etc. The image capturing devices used to capture the images of the finger gestures and facial features encompass one or more cameras forward facing cameras 108, multiple cameras or image capturing devices (e.g. stereoscopic pair of cameras) disposed on an inside surface of the HMD 102 and directed toward the eyes and other facial features of the user, an IR camera, a depth camera, external cameras 109 disposed in the physical environment and facing the user, or any two or more combinations thereof.

In some implementations, the gesture interpretation engine 200*a* at the computer 106 performs preliminary processing of the images and the sensor data to identify the finger gestures and facial features of the user captured as the user is interacting in the metaverse to identify specific ones of the fingers used to provide the gestures and specific ones of the facial features used to provide the expressions on the user face, the extent of movement (including direction, amount of change, etc. . . . ) of the fingers and facial features, and forwards the identified details related to the finger gestures and facial features to the gesture interpretation engine 200*b* executing on a server in the application cloud 112 for further processing. The gesture interpretation engine 200*b* processes the received finger gesture and facial features details provided by the gesture interpretation engine 200*a* to identify attributes of the finger gestures including gesture magnitude, and validate the finger gestures and the gesture magnitude using details from the facial features. In alternate implementations, the finger gestures and facial features' processing is done by the gesture interpretation engine 200a at the computer 106 itself and the attributes of the gestures, the gesture magnitude and the images of the facial features identified by the gesture interpretation engine 200a are forwarded to the gesture interpretation engine 200b at the application cloud 112 to validate and interpret the finger gesture details to define input that can be applied to the interaction of the user in the metaverse.

FIG. 2 illustrates various components of an example gesture interpretation engine 200 used to track the finger gestures and facial features of a user and to interpret the captured finger gestures and facial features to define input for applying to an interaction within a metaverse, in one implementation. To assist in capturing and processing the finger gestures and facial features, the gesture interpretation engine 200 includes a plurality of components. Some of the components include an image analysis engine 210, gesture identification engine 220, context analysis engine 230, gesture verification engine 240, gesture scaling engine 250 and gesture interpretation engine 260. In addition to the various components, the gesture interpretation engine 200 also interacts with one or more databases to retrieve relevant content stored within for processing the gesture and facial feature data. For example, the gesture interpretation engine 200 can query and receive profile data of a user from a user profile datastore (not shown), content provided in the metaverse from a metaverse content datastore (not shown), to name a few.

The gesture interpretation engine 200 receives the images of the user as the user is interacting in the metaverse and captured by the one or more sensors and image capturing devices and processes the images to identify and interpret the gestures. An image analysis engine 210 within the gesture interpretation engine 200 analyzes the images to identify the body parts of the user that are captured, determine if the body parts of the user captured are the ones that are being tracked, and if so, if the tracked parts are being used to perform some gestures. Once the image analysis engine 210 verifies and validates that the user is performing some gestures, then the details of the gestures captured in the images are forwarded to a gesture identification engine 220.

The gesture identification engine 220 receives the details of the gestures from the image analysis engine 210 and performs further analysis of the images to identify various attributes (220a) of the gestures captured within. The attributes are determined by tracking movement of certain one(s) of the body parts of the user that was used to provide the gesture, such as fingers, arms, facial features, etc., wherein the identity of the body parts for tracking can be specified in the gesture interpretation engine 200. The gestures can be finger gestures, arm gestures, facial gestures, input gestures provided using one or more input devices or input surfaces, etc. Depending on the type and amount of data the image capturing devices and sensors are configured to capture, the data captured, in some implementations, can include details of just the finger gestures, the finger gestures and arm gestures, or finger gestures, arm gestures, and facial gestures. In some implementations, data related to the finger and hand gestures are used to define the attributes of the gestures and the facial gestures are used to further validate the attributes of the finger and hand gestures. Each of the image capturing devices and the input devices used for providing the gestures is connected to the computer 106 and/or the server at the application cloud 112 over the network 110 using wired or wireless connection so that the captured details of the gestures can be transmitted to the gesture interpretation engine 200 executing at the respective computer 106 or the cloud server, for further processing.

FIG. 2A illustrates some of the modules within the gesture identification engine 220 that are used to track movement of the body parts of the user present in the physical environment while interacting within the metaverse and use the details from the tracking to identify the type and extent (i.e., magnitude) of gestures provided by the user. The tracking of the body parts includes tracking changes to the position, orientation or location of the body parts due to movement of the body parts and to evaluate such changes, wherein the changes in the position, orientation or location of a body part can correspond with changes in the position, orientation or location of the user. The changes are tracked by first identifying the interactive space in which the user's body parts are contained and then tracking the movement of the body parts in relation to the identified interactive space. An interactive space identification engine 222 of the gesture identification engine 220 is used to identify the space within the physical environment where the user is present and then identify a portion of the space where the body parts of the user being tracked are contained. The interactive space identification engine 222 maps the physical environment of the user to identify the location of the various real-world objects contained within, and then identify the space occupied by the user by mapping the location of the user in relation to the real-world objects. The mapping is a three-dimensional mapping and therefore the interactive space is defined as a three-dimensional space. The interactive space identification engine 222 can use the three-dimensional mapping of the interactive space to track the different body parts of the user used in providing the gestures. Details of defining the interactive space for tracking the body parts of the user will be discussed in more detail with reference to FIGS. 3A-3C.

The interactive space, in some implementations, is defined using a virtual bounding box. The dimensions of the virtual bounding box are defined so as to be sufficient to encompass and fully contain the body parts of the user being tracked. Since the interactive space is defined to be three-dimensional space, the virtual bounding box, in some implementations, is defined to be three-dimensional and is represented using (x, y, z) coordinates. In alternate implementations, the interactive space is defined as a two-dimensional space and the virtual bounding box is defined to be two-dimensional and is represented using (x, y) coordinates. The interactive space changes in response to movement of the body parts of the user and the virtual bounding box is defined to move with the body parts so that the virtual bounding box correctly represents the current interactive space of the user.

The details of the interactive space are provided to the movement tracking engine 224 of the gesture identification engine 220, so that the interactive space can be monitored to detect any changes to indicate movement of the body parts of the user. The movement tracking engine 224 analyzes the images of the user captured by the image capturing devices and sensor data from the sensors to determine any change(s) in the position and/or orientation of the user and of the body parts of the user contained within the virtual bounding box. The change in the position and/or orientation of the body parts can result in a change in a size and/or position of the virtual bounding box. When a change is detected in the position and/or orientation of one or more body parts of the user, the movement tracking engine 224 computes the extent of such change by, (a) computing the difference in the coordinates of the virtual bounding box prior to the change and after the change, and (b) computing the difference in the coordinates of the body parts contained within the virtual bounding box. In some implementations, the user can perform gestures that are contained well within the original (i.e., initial) virtual bounding box defined for the user. This can be the case for a user who usually performs small gestures. In such cases, changes in the movement of the body parts are determined by computing the difference in the coordinates of the body parts prior to and after providing the gestures. In other implementations, the user can perform gestures that result in the body parts moving out of the initial interactive space (i.e., outside of the initial virtual bounding box) defined for the user. This can be the case for the user who performs big gestures (i.e., moving their body parts (e.g., hands, arms, etc.) broadly). In such cases, the changes in the movement of the body parts can be computed as the difference in the coordinates of the virtual bounding box and each of the body parts before and after the gesture.

The computed changes in the coordinates of the virtual bounding box and of each of the body parts are forwarded by the movement tracking engine 224 to the movement evaluation engine 226. The movement evaluation engine 226 of the gesture identification engine 220 evaluates the change to determine various attributes of the gestures provided through the movement of the body parts. For example, the movement evaluation engine 226 analyzes the changes occurring due to the movement of the body parts to identify the attributes of the gestures. The attributes identified can include observed attributes and derived attributes. Some of the observed attributes identified by the movement evaluation engine 226 can include identity of each body part that was used to provide a gesture, type of change detected (e.g., waving, swiping, tapping, clapping, first bumping, first shaking, etc., detected from changes in the hands and arms), the extent of such movement of the body part, direction of movement, speed of movement, space occupied by the user when providing the gesture, pressure applied while holding an input device (e.g., controller), pressure applied on a surface or on a control key or button disposed on an input device, extent of movement of a facial feature (when the body part is a facial feature), etc. The observed attributes are used to define derived attributes. For example, from the direction and speed of movement of a finger across a touch screen, the velocity of the finger movement is computed. In another example, from the pressure applied when providing the input, the mood of the user can be deduced. For example, an excited player can be holding the controller too tightly or can be providing the input using a lot of pressure. Additionally, from the movement of one or more facial features, the mood of the user can be deduced. For example, from the observed attributes of a player, it can be seen that the player has their eyes open wide and their eyebrows knitted to indicate that the player is fully engaged in the content of the metaverse. From the above example, the player who is excited is shown to be holding their controller tightly or pressing the buttons or controls of a controller too much. The movement evaluation engine 226 can interpret the movements of the fingers and the pressure applied on the surface of the controller as the user is holding the controller to compute a grip strength. Additionally, the pressure applied while holding the controller or when providing input on a touch surface of the controller, or when interacting with each of the controls on the controller can be used to determine the mood of the user. The mood of the user can be verified by analyzing the observed facial features of the user. The observed and derived attributes of the user can thus be used by the movement evaluation engine 226 to determine the type of gesture presented, the gesture magnitude, gist of the user's expression, gist of the gesture, mood of the user, etc. The gesture attributes and the gesture magnitude are used to verify the gestures.

Referring back to FIG. 2, the gesture attributes and the gesture magnitude identified from the images and sensor data are used by the gesture verification engine 240 to verify the gesture of the user to determine if the gestures are appropriate in the context of the interaction. A context analysis engine 230 is first used to determine the context of the interaction of the user in the metaverse. For instance, the user can be interacting with a video game application executing in the metaverse, wherein the interaction can be as a player or a spectator. In this instance, the context can be in relation to the video game, and more specifically, in relation to a video game scene. Alternately, the interaction can be in the form of a user holding a conversation with another user or a group of other users present in the metaverse, wherein the user can be communicating with the other user or the group of other users via the respective avatars. The input can be communicating additional information related to a specific content that is a target of the conversation between the users, or to communicate a certain level of importance of a certain action performed by the user via their avatar, or to communicate instructions to a second user to perform certain activity and a level of urgency for performing the certain activity within the metaverse. In another instance, the user can be interacting with shared content, or can be providing content for sharing with other users, etc. The context analysis engine 230 analyzes the content that the user is interacting within the metaverse and identifies the context of the interaction. The context and the content of interaction is forwarded to the gesture verification engine 240 as inputs.

The gesture verification engine 240 analyzes the attributes and gesture magnitude provided by the gesture identification engine 220 against the context, content provided by the context analysis engine to determine if the gestures are in accordance to the context of the interaction of the user. Additionally, the gesture verification engine 240 determines whether the gesture magnitude of the user is exaggerated or muted in relation to the context of the interaction. In some implementations, the gesture attributes and the gesture magnitude of the user are verified against the user's own prior gestures to determine if the current gestures provided by the user are exaggerated or are muted or match with their own prior gestures. To understand if the user's gestures are exaggerated or are muted or matched, the gesture verification engine 240 examines the user's current gestures in the context of the interaction to determine if the current gestures are appropriate for the context of the interaction. If they are, then the current gestures are compared against prior gestures provided by the user for the same context. The prior gestures of the user can be stored in a gesture datastore (not shown) and provided to the gesture verification engine 240 as and when the gestures of the user need to be verified. In some implementations, the typical gestures of the user for different context may be stored in an user profile datastore (not shown) and retrieved for verification. If the user's current gestures are found to be appropriate for the context of the interaction and are detected to be exaggerated or muted, the gesture verification engine 240 examines the interaction environment of the user in the metaverse to determine if the environment calls for such exaggerated (or muted) gestures from the user. For example, the user may exaggerate their gestures in the company of their friends when they are watching a sporting event and mute their gestures in the company of their family members or in a professional setting. Thus, examining the gestures of the user based on the environment, the gesture verification engine 240 can determine if the exaggerated (or muted) gestures of the user is appropriate in the context of the environment or not.

In some implementations, when the interaction of the user is with one or more of other users present in the metaverse, the gesture verification engine 240 may examine the gesture attributes and the gesture magnitude of the user in the context of the interaction with other users to determine if the user's gestures are exaggerated, appropriate or muted. The gestures are deemed to be appropriate if the gesture attributes and the gesture magnitude of the user's current gestures match the corresponding gesture attributes and the gesture magnitude of the other users who are present and with whom the user is interacting with in the metaverse. If the gesture attributes and gesture magnitude are appropriate or muted, then the gesture verification engine 240 will deem the user's reaction as appropriate in the context of the interaction. If, however, the gesture attributes and gesture magnitude are exaggerated, then the gesture verification engine 240 will flag the gestures as being exaggerated and has to be scaled down. Thus, the gesture verification engine 240 verifies the gesture attributes and the gesture magnitude of the current gestures of the user in the context of the interaction, including context of the content, context of the user's prior gestures, context of the environment in which the user is present, context of interactions of other users who are present in the metaverse and with whom the user is interacting to determine if the gestures are appropriate or need to be scaled down.

In some implementations, the context of the interaction, the content, the environment in which the user is interacting in the metaverse, the gesture attributes including gesture magnitude are provided to a machine learning algorithm within the gesture verification engine. The machine learning algorithm builds and trains an artificial intelligence (AI) model using the context, the content, the environment, and gesture features identified for the media content and generates outputs that identify the expressed intentions of the user providing the gestures. Gestures provided by other users as they interact with different content, context, environment in the metaverse are also used in training the generated AI model. As and when additional gestures are provided by the user and as and when changes are detected in the content, context, environment that the user is interacting with in the metaverse, the AI model is refined. The machine learning algorithm uses classifiers to classify the various data and update the AI model. The AI model uses the gesture attributes of the user and of other users, the context of the media content, the content, and the environment to generate an output corresponding to current gestures provided by the user, wherein the output corresponds to the specific context of interaction, specific content, specific events occurring within the content, and specific environment that the user is immersed in their interaction in the metaverse. The identified output of the AI model defines their expressed intention of the user, wherein the expressed intentions of the user can include their mood, the urgency or importance that they want to convey in the metaverse, etc. The output of the AI model become the input that needs to be applied in the metaverse.

Details of the gestures, including the gesture attributes, gesture magnitude of the user and of the other users, context of the interaction, environment of the interaction, the flag, if set to indicate exaggerated gestures, etc., are provided as input to the gesture scaling engine 250. The gesture scaling engine 250 uses the details provided by the gesture verification engine 240 to scale the gestures by adjusting the gesture attributes and the gesture magnitude of the user's current gestures so that the gestures are deemed appropriate for the context of the interaction. An amount of scaling is determined in accordance to the context of the interaction, the environment in the metaverse in which the user is interacting, and the amount by which the user's current gestures are exaggerated. The adjusted gesture attributes and gesture magnitude is forwarded by the gesture scaling engine 250 to the gesture interpretation engine 260. The gesture interpretation engine 260 interprets the gesture attributes and the gesture magnitude in the context of the interaction to generate an input for applying to the interaction in the metaverse. The input generated by the gesture interpretation engine 260 is forwarded to an input application engine 270. The input application engine 270 determines the context of the interaction of the user in the metaverse, identifies the content or application or entity where the input has to be applied in the metaverse and forwards the input accordingly. In some implementations, the input can be applied in the metaverse as additional information to content in the metaverse, or as a comment or a feedback to another user, or as a response from the user to a conversation held between the user and another user, or as instructions to an avatar of the user that is interacting with content or with avatars of other users present in the metaverse, or as an input to an interactive application (e.g., a video game or a chat or a social media application) available in the metaverse, or to adjust the expressions on an avatar of the user so as to mimic the expressions of the user, or to adjust the avatar of the user to behave in a manner similar to or appropriate in the group of avatars of other users, to name a few. In the case where the input is to an interactive application, the input can be interpreted to define an amount of adjustment that is to be made in the interactive application to affect a state. For example, the interactive application can be a video game application. In this example, the input can be interpreted to define an amount of adjustment that is to be made for the user's input to generate a current state. In another example, the interactive application can be a sign language communication application. In this example, the input can be interpreted to define an amount to which the sign language has to be adjusted to convey the urgency or importance that was defined using the gestures. In yet another example, the interactive application can be a communication application, such as a social media application or a chat/messaging application. In this example, the input is interpreted to convey the importance of content shared by the user within the communication application. Thus, the input generated by interpreting the gestures of the user and scaled in accordance to the content, context, environment and/or situation of the metaverse, is applied in accordance to context of the interaction of the user in the metaverse. The input from interpreting the gestures can be in addition to the inputs provided by the user through regular channels, such as input devices.

FIGS. 3A-3C illustrate some examples of the interactive space identified within the physical environment of the user, in some implementations. The interactive space is defined to contain the various body parts of the user that are identified for tracking. FIGS. 3A and 3B illustrate the tracking of the hand gestures and facial features of the user, in one implementation, where the tracked facial features show that the user is expressing a particular emotion (e.g., emotion 1), and FIG. 3C illustrates the tracking of the hand gestures and the facial features of the user, in another implementation, where the tracked facial features show that the user is expressing a different emotion (e.g., emotion 2). The gesture interpretation engine 200 tracks the body parts of the user as the user is interacting in the metaverse, by first identifying an interactive space within a physical environment where the user is operating. In some implementations, since the physical environment is represented in three-dimensions, the interactive space represented by a virtual bounding box, is also defined in three-dimensions. Accordingly, the virtual bounding box is represented using the (x, y, z) coordinates. In alternate implementations, the virtual bounding box representing the interactive space is represented in two dimensions using (x, y) coordinates. In such implementations, the three-dimensional interactive space is converted to two-dimensions and the virtual bounding box is defined by (x, y) coordinates. A size of the bounding box is defined so as to contain the body parts, such as the arms, the hands, the face, etc., of the user that are being tracked. In FIG. 3A, the bounding box, 'B1' represents the interactive space at time 't1' and is shown to be sized to contain the upper body portion of the user, including the arms, the hands, and the face. Further, to keep it simple, the bounding box B1 is represented in two-dimension as a rectangle but can be represented to adopt any other shape other than rectangle and can be represented in three-dimensions as well. As the user continues to interact in the metaverse, the face, arm and/or hands of the user continue to be tracked and when movements are detected at one or more body parts of the user, the gesture interpretation engine 200 detects the change (s) and dynamically adjusts the bounding box containing the tracked body parts of the user from B1 to B2.

FIG. 3B illustrates the change in the interactive space due to the movements of the hands and arms of the user resulting in dynamic adjustment of the bounding box from B1 to B2 so that the arms, hands are fully contained within. The bounding box B2 represents the interactive space at time 't2'. In the illustration shown in FIGS. 3A and 3B, the bounding boxes B1 and B2 are shown to have same size and the coordinates representing bounding box B2 varies from that of bounding box B1 with respect to the horizontal coordinates. Depending on the extent of movement of the body parts of the user, the horizontal and vertical coordinates representing the bounding box can vary in size and the coordinates representing the bounding box are dynamically adjusted to reflect the same. The coordinates of the virtual bounding box B1, B2 are used to determine the changes in the gestures of the user due to movement of one or more body parts. The changes in the gestures are captured in the images by the image capturing devices and the movement data related to the movement of the body parts are captured by the sensors. The gestures provided by the user are verified against the changes in the facial features of the user to determine if the changes in the gestures correlate with corresponding changes in the expressions expressed by the user.

FIG. 3C illustrates another example of the interactive space containing the body parts of the user as the user is performing gestures, in an alternate implementation. In this example, by tracking the facial features of the user, it can be seen that the user is expressing a different emotion (i.e., anger) as evidenced by the user shaking their clenched first in the air and the user expressing the anger expression, as can be evidenced by the snarly look expressed by the user. As can be noticed in FIG. 3C, the size of the interactive space represented by bounding box 'B3' is much smaller than the bounding boxes B1 and B2 of FIGS. 3A, 3B. Thus, based on the type of gesture provided by the user and the extent to which the user moves their arms and hands when performing the gestures, the interactive space can be defined and the image capturing devices and sensors use the defined interactive space to keep track of the movements of the user's body parts.

Figure 4A:
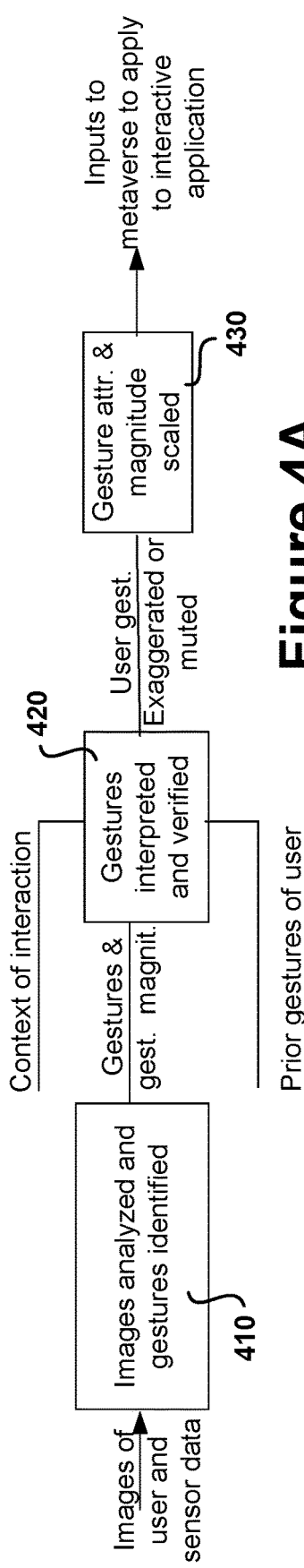
FIGS. 4A and 4B illustrate sample data flow followed in analyzing the gestures of the user to identify inputs for applying in a metaverse, based on context of communication, in accordance with alternate implementations.

FIG. 4A illustrates the flow of data as the images and sensor data capturing the gestures of the user are processed by the gesture interpretation engine 200 to generate input for applying to the interaction in the metaverse, in one implementation. The images of the user obtained from image capturing devices and sensor data from a plurality of sensors are analyzed to determine if the user is engaged in providing gestures (410) and, if so, to identify the gesture attributes. The gesture attributes are evaluated to determine gesture magnitude. The gesture attributes and gesture magnitude are interpreted and verified (420) in the context of the interaction. Additionally, the gesture attributes and gesture magnitude of the gestures are compared against the user's own prior gestures for same or similar context of the interaction to determine if there is a substantial match or are exaggerated. When it is determined that the user's gestures are exaggerated for the context of the interaction (e.g., exaggerated in comparison to other users gestures or in relation to the context of content), the gesture attributes and magnitude are dynamically scaled (430) so that the gestures that correspond with the scaled down gesture attributes and gesture magnitude are appropriate for applying to an interactive application, content of which the user is interacting with in the metaverse. The scaled down gesture attributes and gesture magnitude of the gestures are forwarded to the metaverse for applying to the interactive application, such as video game application, wherein the gestures are provided as input to the video game, or to adjust the avatars of the user, or convey information (e.g., gestures) via the avatar of the user to other avatars.

Figure 4B:
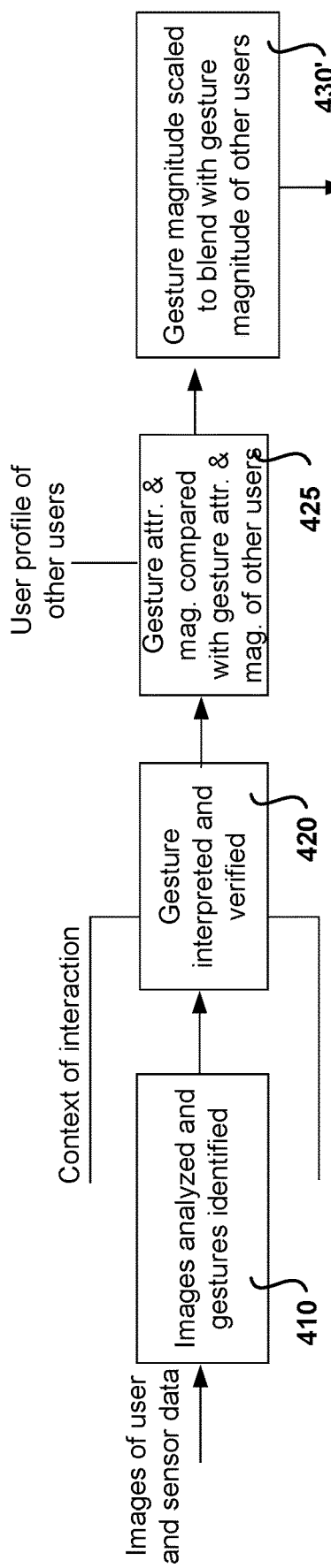

FIG. 4B illustrates an alternate flow of data as the images and sensor data capturing the gestures of the user are processed by the gesture interpretation engine 200 to generate input for applying to the interaction in the metaverse, in an alternate implementation. The flow of data in FIG. 4B varies from that of the flow illustrated in FIG. 4A in the operation 425 and 430'. Consequently, the data flow that is common with FIGS. 4A and 4B are represented using the same reference numeral and are not described in detail. As shown in FIG. 4B, after the gestures are interpreted and verified, the gesture attributes and gesture magnitude pertaining to the gestures are compared with that of the other users (425). The gesture magnitude and gesture attributes of other users are identified for the context of interaction and used in the comparison. When the comparison results in the gesture attributes and gesture magnitude of the current gestures being exaggerated in comparison to the other users present in the video game (e.g., the user being loud in their gestures (i.e., waving their hands broadly)), the gesture attributes and gesture magnitude associated with the current gestures are scaled down (430') so that the resulting magnitude and scale of the gestures of the user match the magnitude and scale of that of the other users. The scaled down gestures are then interpreted to generate inputs for applying to an avatar of the user to adjust the expressions and gestures of the avatar of the user in the metaverse.

Figure 5:
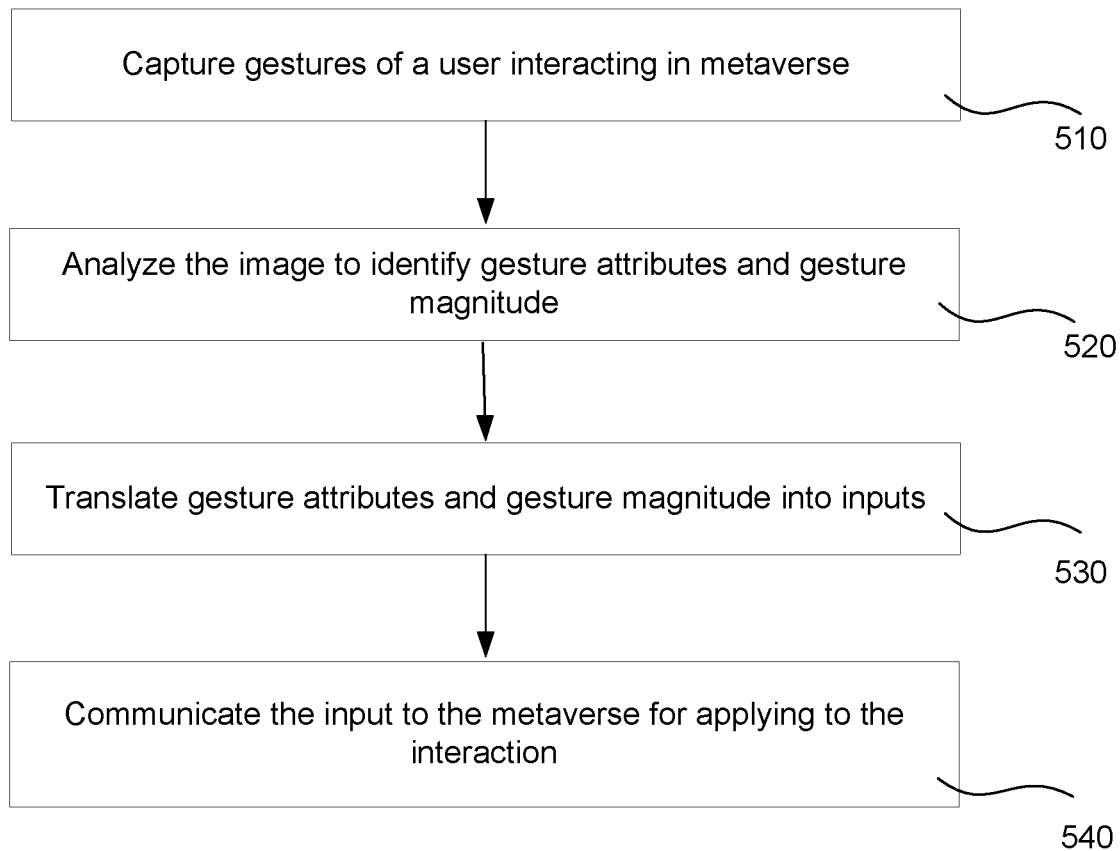
FIG. 5 illustrates flow of operations of a method for using images of gestures of a user as captured by a plurality of sensors and determining input for applying in metaverse, in accordance with one implementation.

FIG. 5 illustrates a flow of operations of a method used to process images of gestures performed by a user and the sensor data pertaining to the gestures as the user is interacting with content in a metaverse and interpreting the gestures of the user in the context of the interaction in the metaverse, in one implementation. The method begins at operation 510 where images of the user performing gestures are captured using image capturing devices as the user is interacting in the metaverse and sensor data is collected from various sensors distributed in the physical environment of the user. The images captured are of the body parts of the user that are being tracked. The images and sensor data are analyzed to identify gestures performed by the user, as illustrated in operation 520. The analysis is done in the context of the interaction, wherein the interaction of the user can be with an interactive application, such as a video game or a social media application or a chat/message application, etc., where the user is able to upload video content, gestures, text, GIFs (graphic interchange format files), graphics, audio content, or any other type of content that can be uploaded, shared with or by other users, or with avatars of other users present in the metaverse, or with the avatar of the user themselves, etc. Consequently, the analysis is done in the context of content that the user is interacting with and/or in the context of the environment that the user is interacting in and/or in the context of other users that the user is interacting with in the metaverse.

Once the gestures are identified, the gestures of the user are evaluated to determine the gesture attributes from which gesture magnitude is computed. The gesture attributes and the gesture magnitude are compared against prior gestures of the user to see if the current gestures are exaggerated and, if exaggerated, whether the exaggeration is justified in the context of the interaction. If the gestures are justified in the context of the interaction, then the gestures are considered as is without any adjustments. If, however, it is determined that the gestures are exaggerated in the context of the interaction, then the gesture attributes and gesture magnitude are attenuated (i.e., scaled down), in accordance to the context of the interaction, wherein an amount of attenuation is driven by the amount of exaggeration determined from the gesture magnitude and the context of the interaction. If, however, it is determined that the gestures are way too muted, then the gesture attributes and gesture magnitude are augmented (i.e., scaled up), in accordance to the context of the interaction, wherein an amount of augmentation is driven by the amount of muting determined from the gesture magnitude and the context of the interaction. In some implementations, the facial features of the user are analyzed to validate the gesture magnitude of the gestures (i.e., level of exaggeration or muting expressed in the gestures) and the gesture magnitude can be attenuated or augmented based on the validated gesture magnitude. The attenuation or augmentation of the gesture attributes and gesture magnitude cause the gestures to be within the level of expression that is appropriate for the interaction. In some examples, when the gestures are exaggerated, indicating that the gesture magnitude indicates the level or amount of exaggeration of the gestures is above a pre-defined threshold, then the gesture interpretation engine 200 interprets the gesture magnitude and sends a first signal to indicate a level of urgency that is to be conveyed with an input generated by interpreting the gestures. The level of urgency communicated with the input is augmented to be commensurate with the gesture magnitude of the gesture. Similarly, if the level or amount of muting of the gestures is below the pre-defined threshold, the gesture interpretation engine 200 interprets the gesture magnitude and sends a second signal with the input to avoid distracting the user during their interaction in the metaverse.

The gesture attributes and gesture magnitude (either scaled down or original) are translated, in accordance to context of the interaction, into input for applying in the metaverse, as illustrated in operation 530. The input is then communicated to the metaverse for applying to content associated with the interaction, as illustrated in operation 540. The input applied to the content is in accordance to context of the content, the environment, the interaction standard defined by other users present in the metaverse, so that the user's input blend with the other users and do not stand out as being too loud or brash or showy. For example, the input can be applied to adjust expressions and gestures To summarize, the various embodiments discussed herein are directed toward interpreting gestures provided by a user who is interacting in the metaverse so as to generate input that can be applied to content of the metaverse. The user's movement are tracked and learned over time so as to avoid falsely attenuating or exaggerating the gesture communication based on captured magnitude. The user's gestures can be finger gestures, and the images can be used to detect what fingers of the user are being used and what gestures are provided by each finger and combination of fingers. The finger gestures can be interpreted as input to sign language or can be used to communicate information to another user in the metaverse. The communication can be translated and rendered through the user's avatar to another avatar of another user or to the avatars of a team of users. The finger gestures are interpreted to define gesture magnitude, wherein the gesture magnitude can include attributes such as speed, direction, space occupied by user, extent of space to consider for capturing the gestures, the extent of pressure applied, location where pressure is applied (e.g., the handle of the controller when holding, buttons, input surface, joystick, etc.) etc., from which other attributes, such as amount of excitement, gist of user's expressions, velocity associated with the gesture, etc., can be computed/derived. The gesture magnitude is interpreted to understand the urgency or importance or excitement of the user providing the gestures and other inputs and to translate the excitement or importance to an input applied to the user's avatar or to an interactive application or to a communication between the user and other users via the respective avatars. The gestures are interpreted in the context of the content, type of environment, types of users that the user is interacting with so as to avoid falsely attenuating or augmenting the gesture attributes. Further, the gesture interpretation engine finds ways to interpret the gestures of a user who gestures in a exaggerated manner in a way that is similar to the interpretation of gestures of a user who gestures mildly. The gestures are interpreted in accordance to the content, the context, the environment, other user(s) present in the environment, and validate the interpreted gestures against other input clues, such as facial features providing expressions, voice providing sounds (representing emotions), speed of gestures, etc., provided by the user to ensure that the user's expressions correlate with the observed and derived gesture attributes.

The gestures of the user are dynamically adjusted as the user moves from one location to another location (e.g., a first game scene to a second game scene in a video game application, a first interactive application to a second interactive application, etc.) so that the adjusted gestures allow the user or the avatar of the user to blend in with the environment as changes are happening with reference to the content presented. The changes to content can include changes to scene, content, presence of other users, etc. In some implementations, the gesture interpretation engine 200 uses the profile of the avatars of other users in the metaverse space where the user is interacting to scale the user's own avatar so that the user's avatar behavior best blends with the behavior of the other avatars and/or context occurring in the space within the metaverse. This type of dynamic adjusting of the gestures enables not only the avatar of the user to blend with the environment but also to ensure that the behavior of the user's avatar (e.g., gestures, actions, etc.,) avoids the user from standing out.

The gesture interpretation engine analyzes the user's gestures over a period of time and recognizes the style of the user's gestures and identifies specific patterns for different context of content and situation the user is involved in interacting with in the metaverse. When the user provides new gestures, the gesture interpretation engine performs gesture recognition mapping with the prior gestures to see how close the user's current gestures are to the average of the gestures for the same or similar context defined in the prior gestures. Using the gesture recognition mapping, the gesture interpretation engine is able to recognize the gestures quickly and efficiently and also determine if the user's gestures are exaggerated or muted. Based on the determination, the gesture interpretation engine is able to perform appropriate scaling to fit the environment associated with and the context of the interaction of the user in the metaverse.

Figure 6:
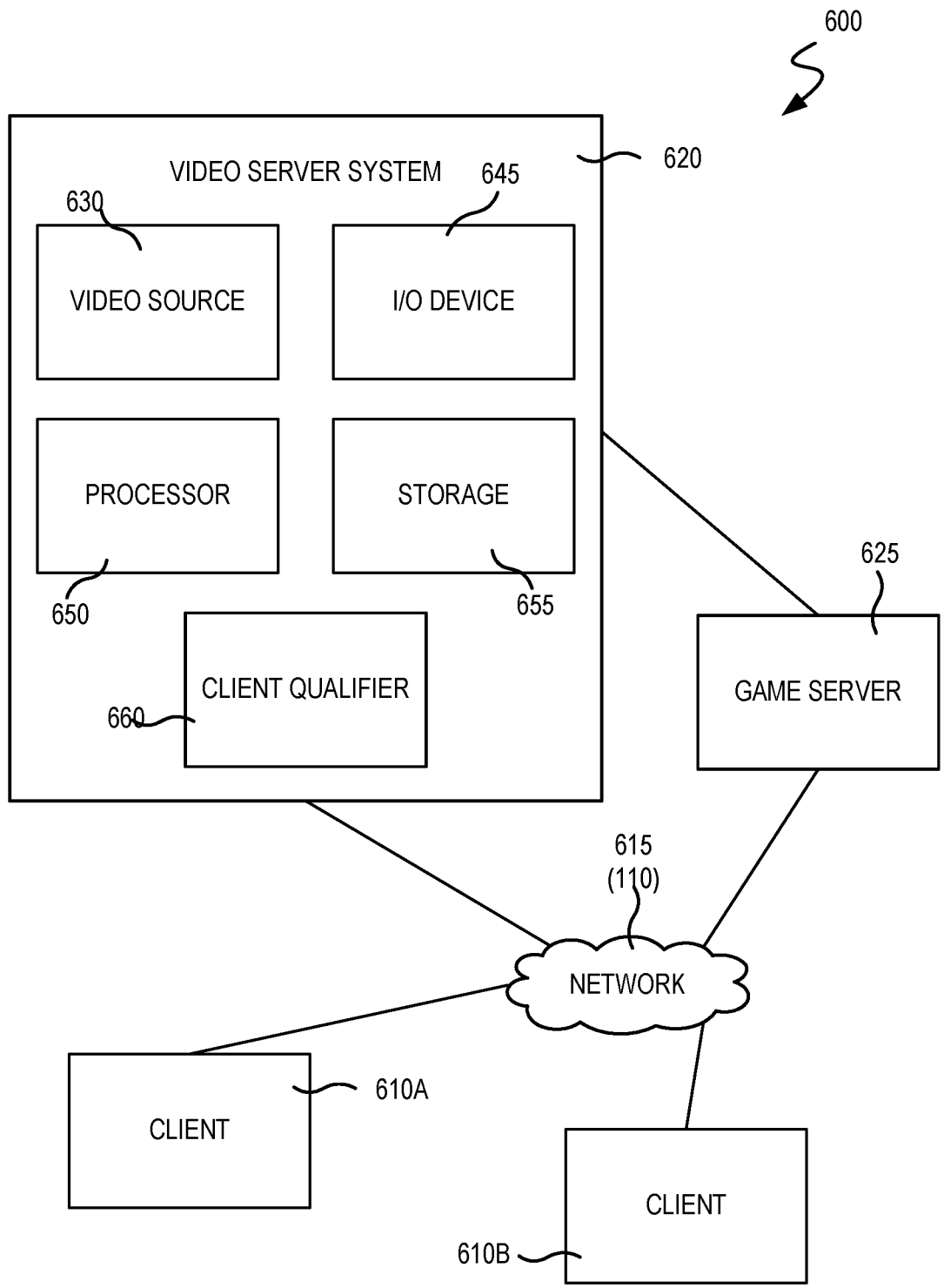
FIG. 6 illustrates components of an example system that can be used to process requests from a user, provide content and assistance to the user to perform aspects of the various implementations of the present disclosure.

FIG. 6 is a block diagram of an example Game System 600 that may be used to provide content to the HMD for user consumption and interaction, according to various embodiments of the disclosure. Game System 600 is configured to provide a video stream to one or more Clients 610 via a Network 615, wherein one or more of the clients 610 may include HMD (102), eyeglasses, or other wearable devices. In one implementation, the Game System 600 is shown to be a cloud game system with an instance of the game being executed on a cloud server and the content streamed to the clients 610. In an alternate implementation, the Game System 600 may include a game console that executes an instance of the game and provides streaming content to the HMD for rendering. Game System 600 typically includes a Video Server System 620 and an optional game server 625. Video Server System 620 is configured to provide the video stream to the one or more Clients 610 with a minimal quality of service. For example, Video Server System 620 may receive a game command that changes the state of or a point of view within a video game, and provide Clients 610 with an updated video stream reflecting this change in state with minimal lag time. The Video Server System 620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 610, referred to herein individually as 610A, 610B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 610 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 610 or on a separate device such as a monitor or television. Clients 610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 610 are optionally geographically dispersed. The number of clients included in Game System 600 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 620 to deliver a game viewed through the HMD. In one embodiment, the game console receives the video stream from the video server system 620, and the game console forwards the video stream, or updates to the video stream, to the HMD for rendering.

Clients 610 are configured to receive video streams via Network 615 (110 of FIG. 1). Network 615 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 610 may, but are not required to, further include systems configured for modifying received video. For example, a Client may be configured to perform further rendering, to overlay one video image on another video image, to crop a video image, and/or the like. For example, Clients 610 may be configured to receive various types of video frames, such as I-frames, P-frames and B-frames, and to process these frames into images for display to a user. In some embodiments, a member of Clients 610 is configured to perform further rendering, shading, conversion to 3-D, or like operations on the video stream. A member of Clients 610 is optionally configured to receive more than one audio or video stream. Input devices of Clients 610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 610 is generated and provided by Video Server System 620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 610 are typically configured to receive inputs from a user. These inputs may include game commands configured to change the state of the video game or otherwise affect game play. The game commands can be received using input devices and/or may be automatically generated by computing instructions executing on Clients 610. The received game commands are communicated from Clients 610 via Network 615 to Video Server System 620 and/or Game Server 625. For example, in some embodiments, the game commands are communicated to Game Server 625 via Video Server System 620. In some embodiments, separate copies of the game commands are communicated from Clients 610 to Game Server 625 and Video Server System 620. The communication of game commands is optionally dependent on the identity of the command. Game commands are optionally communicated from Client 610A through a different route or communication channel that that used to provide audio or video streams to Client 610A.

Game Server 625 is optionally operated by a different entity than Video Server System 620. For example, Game Server 625 may be operated by the publisher of a multi-player game. In this example, Video Server System 620 is optionally viewed as a client by Game Server 625 and optionally configured to appear from the point of view of Game Server 625 to be a prior art client executing a prior art game engine. Communication between Video Server System 620 and Game Server 625 optionally occurs via Network 615. As such, Game Server 625 can be a prior art multiplayer game server that sends game state information to multiple clients, one of which is game server system 620. Video Server System 620 may be configured to communicate with multiple instances of Game Server 625 at the same time. For example, Video Server System 620 can be configured to provide a plurality of different video games to different users. Each of these different video games may be supported by a different Game Server 625 and/or published by different entities. In some embodiments, several geographically distributed instances of Video Server System 620 are configured to provide game video to a plurality of different users. Each of these instances of Video Server System 620 may be in communication with the same instance of Game Server 625. Communication between Video Server System 620 and one or more Game Server 625 optionally occurs via a dedicated communication channel. For example, Video Server System 620 may be connected to Game Server 625 via a high bandwidth channel that is dedicated to communication between these two systems.

Video Server System 620 comprises at least a Video Source 630, an I/O Device 645, a Processor 650, and non-transitory Storage 655. Video Server System 620 may include one computing device or be distributed among a plurality of computing devices. These computing devices are optionally connected via a communications system such as a local area network.

Video Source 630 is configured to provide a video stream, e.g., streaming video or a series of video frames that form a moving picture. In some embodiments, Video Source 630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 625. Game Server 625 may maintain a copy of the state of the game based on game commands received from multiple players using geographically disperse clients. In these cases, the game state is provided by Game Server 625 to Video Source 630, wherein a copy of the game state is stored and rendering is performed. Game Server 625 may receive game commands directly from Clients 610 via Network 615, and/or may receive game commands via Video Server System 620.

Video Source 630 typically includes rendering logic, e.g., hardware, firmware, and/or software stored on a computer readable medium such as Storage 655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 610. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×620 (e.g., 620p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 630 includes a video recording device such as a camera. This camera may be used to generate delayed or live video that can be included in the video stream of a computer game. The resulting video stream, optionally includes both rendered images and images recorded using a still or video camera. Video Source 630 may also include storage devices configured to store previously recorded video to be included in a video stream. Video Source 630 may also include motion or positioning sensing devices configured to detect motion or position of an object, e.g., person, and logic configured to determine a game state or produce video-based on the detected motion and/or position.

Video Source 630 is optionally configured to provide overlays configured to be placed on other video. For example, these overlays may include a command interface, log in instructions, messages to a game player, images of other game players, video feeds of other game players (e.g., webcam video). In embodiments of Client 610A including a touch screen interface or a gaze detection interface, the overlay may include a virtual keyboard, joystick, touch pad, and/or the like. In one example of an overlay a player's voice is overlaid on an audio stream. Video Source 630 optionally further includes one or more audio sources.

In embodiments wherein Video Server System 620 is configured to maintain the game state based on input from more than one player, each player may have a different point of view comprising a position and direction of view. Video Source 630 is optionally configured to provide a separate video stream for each player based on their point of view. Further, Video Source 630 may be configured to provide a different frame size, frame data size, and/or encoding to each of Client 610. Video Source 630 is optionally configured to provide 3-D video.

I/O Device 645 is configured for Video Server System 620 to send and/or receive information such as video, commands, requests for information, a game state, gaze information, device motion, device location, user motion, client identities, player identities, game commands, security information, audio, and/or the like. I/O Device 645 typically includes communication hardware such as a network card or modem. I/O Device 645 is configured to communicate with Game Server 625, Network 615, and/or Clients 610.

Processor 650 is configured to execute logic, e.g. software, included within the various components of Video Server System 620 discussed herein. For example, Processor 650 may be programmed with software instructions in order to perform the functions of Video Source 630, Game Server 625, and/or a Client Qualifier 660. Video Server System 620 optionally includes more than one instance of Processor 650. Processor 650 may also be programmed with software instructions in order to execute commands received by Video Server System 620, or to coordinate the operation of the various elements of Game System 600 discussed herein. Processor 650 may include one or more hardware device. Processor 650 is an electronic processor.

Storage 655 includes non-transitory analog and/or digital storage devices. For example, Storage 655 may include an analog storage device configured to store video frames. Storage 655 may include a computer readable digital storage, e.g. a hard drive, an optical drive, or solid state storage. Storage 95 is configured (e.g. by way of an appropriate data structure or file system) to store video frames, artificial frames, a video stream including both video frames and artificial frames, audio frame, an audio stream, and/or the like. Storage 655 is optionally distributed among a plurality of devices. In some embodiments, Storage 655 is configured to store the software components of Video Source 630 discussed elsewhere herein. These components may be stored in a format ready to be provisioned when needed.

Video Server System 620 optionally further comprises Client Qualifier 660. Client Qualifier 660 is configured for remotely determining the capabilities of a client, such as Clients 610A or 610B. These capabilities can include both the capabilities of Client 610A itself as well as the capabilities of one or more communication channels between Client 610A and Video Server System 620. For example, Client Qualifier 660 may be configured to test a communication channel through Network 615.

Client Qualifier 660 can determine (e.g., discover) the capabilities of Client 610A manually or automatically. Manual determination includes communicating with a user of Client 610A and asking the user to provide capabilities. For example, in some embodiments, Client Qualifier 660 is configured to display images, text, and/or the like within a browser of Client 610A. In one embodiment, Client 610A is an HMD that includes a browser. In another embodiment, client 610A is a game console having a browser, which may be displayed on the HMD. The displayed objects request that the user enter information such as operating system, processor, video decoder type, type of network connection, display resolution, etc. of Client 610A. The information entered by the user is communicated back to Client Qualifier 660.

Automatic determination may occur, for example, by execution of an agent on Client 610A and/or by sending test video to Client 610A. The agent may comprise computing instructions, such as java script, embedded in a web page or installed as an add-on. The agent is optionally provided by Client Qualifier 660. In various embodiments, the agent can find out processing power of Client 610A, decoding and display capabilities of Client 610A, lag time reliability and bandwidth of communication channels between Client 610A and Video Server System 620, a display type of Client 610A, firewalls present on Client 610A, hardware of Client 610A, software executing on Client 610A, registry entries within Client 610A, and/or the like.

Client Qualifier 660 includes hardware, firmware, and/or software stored on a computer readable medium. Client Qualifier 660 is optionally disposed on a computing device separate from one or more other elements of Video Server System 620. For example, in some embodiments, Client Qualifier 660 is configured to determine the characteristics of communication channels between Clients 610 and more than one instance of Video Server System 620. In these embodiments the information discovered by Client Qualifier can be used to determine which instance of Video Server System 620 is best suited for delivery of streaming video to one of Clients 610.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for interpreting gestures provided by a user, comprising:
tracking movements of body parts of the user, the tracking done by capturing images of the body parts using a plurality of sensors distributed within a physical environment where the user is operating;
analyzing the images to identify attributes of gestures captured within the physical environment, the attributes of the gestures evaluated to identify at least a gesture magnitude;
translating the attributes of the gestures including the gesture magnitude, based on a context of interaction of the user in a metaverse, to define an input from the user;
evaluating the gesture magnitude in the context of the interaction of the user in the metaverse to define a communication signal for conveying an importance of the input; and
communicating the input and the communication signal for applying to the interaction of the user in the metaverse, the input interpreted in the metaverse in accordance to the context of the interaction of the user in the metaverse and applied in accordance to the importance conveyed by the communication signal.

2. The method of claim 1, wherein the interaction of the user in the metaverse is with a second user, wherein when the gestures of the user are exaggerated and gestures of the second user are muted, interpreting the input in the metaverse further includes, scaling down the input so that a level of exaggeration of the gestures of the user represented in the input matches a level of exaggeration of the gestures included in a second input of the second user, so that the input of the user that is scaled down can be interpreted at a same level as the second input of the second user.

3. The method of claim 1, where comparing the gesture magnitude further includes, examining prior gestures of the user collected over time to identify the attributes and the gesture magnitude for different context of communication, the prior gestures examined to understand a level of exaggeration typically expressed by the user for the different context of communication; and comparing attributes of current gestures to corresponding attributes of the prior gestures identified for the context of interaction to determine if attributes and gesture magnitude of the current gestures match with the corresponding attributes and gesture magnitude for the context of interaction recorded for the prior gestures; when there is a match of the current gestures with the prior gestures, interpreting the attributes of the current gestures in accordance to the context of interaction, the interpretation define a level of urgency that is to be conveyed with the input for applying to the interaction of the user in the metaverse, and when there is no match, dynamically scaling the current gestures included in the input so as to match with the prior gestures, wherein the scaling is done up or down based on a difference in level of exaggeration expressed in the current gestures and the prior gestures.

4. The method of claim 1, wherein translating the attributes of the gestures including the gesture magnitude further includes automatically scaling the gestures and the gesture magnitude based on the context of interaction in the metaverse and in accordance to an environment in which the user is interacting within the metaverse, and based on a target identified in the interaction of the user in the metaverse.

5. A method for interpreting gestures provided by a user, comprising:
capturing images of gestures and facial features of the user interacting in metaverse, the images captured using a plurality of sensors distributed within a physical environment where the user is operating;
analyzing the gestures and the facial features captured in the images to identify attributes of the gestures and to evaluate changes in the facial features, the changes in the facial features are evaluated to determine expressions exhibited by the user when providing the gestures and the attributes evaluated to identify at least a gesture magnitude, the expressions used to validate the gesture magnitude in context of interaction in the metaverse;

translating the attributes of the gestures including the gesture magnitude, based on the context of interaction of the user in the metaverse, to define an input from the user; and communicating the input to the metaverse for applying to the interaction, the input interpreted in the context of the interaction of the user in the metaverse.

6. The method of claim 1, wherein the attributes are translated further based on a target at which the interaction is directed.

7. The method of claim 1, wherein the attributes are translated further based on a facial expression of the user.

8. A non-transitory computer-readable medium storing instructions that, when executed, cause one or more computer processors to perform operations for interpreting gestures provided by a user, the operations comprising:

tracking movements of body parts of the user, the tracking done by capturing images of the body parts using a plurality of sensors distributed within a physical environment where the user is operating;

analyzing the images to identify attributes of gestures captured within the physical environment, the attributes of the gestures evaluated to identify at least a gesture magnitude;

translating the attributes of the gestures including the gesture magnitude, based on a context of interaction of the user in a metaverse, to define an input from the user;

evaluating the gesture magnitude in the context of the interaction of the user in the metaverse to define a communication signal for conveying an importance of the input; and communicating the input and the communication signal for applying to the interaction of the user in the metaverse, the input interpreted in the metaverse in accordance to the context of the interaction of the user in the metaverse and applied in accordance to the importance conveyed by the communication signal.

9. The non-transitory computer-readable medium of claim 8, wherein the interaction of the user in the metaverse is with a second user, wherein when the gestures of the user are exaggerated and gestures of the second user are muted, interpreting the input in the metaverse further includes, scaling down the input so that a level of exaggeration of the gestures of the user represented in the input matches a level of exaggeration of the gestures included in a second input of the second user, so that the input of the user that is scaled down can be interpreted at a same level as the second input of the second user.

10. The non-transitory computer-readable medium of claim 8, where comparing the gesture magnitude further includes, examining prior gestures of the user collected over time to identify the attributes and the gesture magnitude for different context of communication, the prior gestures examined to understand a level of exaggeration typically expressed by the user for the different context of communication; and comparing attributes of current gestures to corresponding attributes of the prior gestures identified for the context of interaction to determine if attributes and gesture magnitude of the current gestures match with the corresponding attributes and gesture magnitude for the context of interaction recorded for the prior gestures; when there is a match for the current gestures with the prior gestures, interpreting the attributes of the current gestures in accordance to the context of interaction, the interpretation define a level of urgency that is to be conveyed with the input for applying to the interaction of the user in the metaverse, and when there is no match, dynamically scaling the current gestures included in the input so as to match with the prior gestures, wherein the scaling is done up or down based on a difference in level of exaggeration expressed in the current gestures and the prior gestures.

11. The non-transitory computer-readable medium of claim 8, wherein translating the attributes of the gestures including the gesture magnitude further includes automatically scaling the gestures and the gesture magnitude based on the context of interaction in the metaverse and in accordance to an environment in which the user is interacting within the metaverse, and based on a target identified in the interaction of the user in the metaverse.

12. The non-transitory computer-readable medium of claim 8, wherein the attributes are translated further a target at which the interaction is directed.

13. The non-transitory computer-readable medium of claim 8, wherein the attributes are translated further based on based on a facial expression of the user.

14. A system comprising:

one or more computer processors; and a non-transitory computer-readable medium storing instructions that, when executed, cause the one or more computer processors to perform operations for interpreting gestures provided by a user, the operations comprising:

tracking movements of body parts of the user, the tracking done by capturing images of the body parts using a plurality of sensors distributed within a physical environment where the user is operating;

analyzing the images to identify attributes of gestures captured within the physical environment, the attributes of the gestures evaluated to identify at least a gesture magnitude;

translating the attributes of the gestures including the gesture magnitude, based on a context of interaction of the user in a metaverse, to define an input from the user;

evaluating the gesture magnitude in the context of the interaction of the user in the metaverse to define a communication signal for conveying an importance of the input; and communicating the input and the communication signal for applying to the interaction of the user in the metaverse, the input interpreted in the metaverse in accordance to the context of the interaction of the user in the metaverse and applied in accordance to the importance conveyed by the communication signal.

15. The system of claim 14, wherein the interaction of the user in the metaverse is with a second user, wherein when the gestures of the user are exaggerated and gestures of the second user are muted, interpreting the input in the metaverse further includes, scaling down the input so that a level of exaggeration of the gestures of the user represented in the input matches a level of exaggeration of the gestures included in a second input of the second user, so that the input of the user that is scaled down can be interpreted at a same level as the second input of the second user.

16. The system of claim 14, where comparing the gesture magnitude further includes, examining prior gestures of the user collected over time to identify the attributes and the gesture magnitude for different context of communication, the prior gestures examined to understand a level of exaggeration typically expressed by the user for the different context of communication; and comparing attributes of current gestures to corresponding attributes of the prior gestures identified for the context of interaction to determine if attributes and gesture magnitude of the current gestures match with the corresponding attributes and gesture magnitude for the context of interaction recorded for the prior gestures; when there is a match of the current gestures with the prior gestures, interpreting the attributes of the current gestures in accordance to the context of interaction, the interpretation define a level of urgency that is to be conveyed with the input for applying to the interaction of the user in the metaverse, and when there is no match, dynamically scaling the current gestures included in the input so as to match with the prior gestures, wherein the scaling is done up or down based on a difference in level of exaggeration expressed in the current gestures and the prior gestures.

17. The system of claim 14, wherein translating the attributes of the gestures including the gesture magnitude further includes automatically scaling the gestures and the gesture magnitude based on the context of interaction in the metaverse and in accordance to an environment in which the user is interacting within the metaverse, and based on a target identified in the interaction of the user in the metaverse.

18. The system of claim 14, wherein the attributes are translated further based on a target at which the interaction is directed.

19. The system of claim 14, wherein the attributes are translated further based on a facial expression of the user.

* * * * *

UNITED STATES PATENT AND TRADEMARK OFFICE
CERTIFICATE OF CORRECTION

| | | |
|---|---|---|
| PATENT NO. | : 12,307,018 B2 | Page 1 of 1 |
| APPLICATION NO. | : 18/295129 | |
| DATED | : May 20, 2025 | |
| INVENTOR(S) | : Victoria Dorn | |

It is certified that error appears in the above-identified patent and that said Letters Patent is hereby corrected as shown below:

In the Claims

Column 28, Line 19, Claim 12, please replace "further a target" with -- further based on a target --.

Column 28, Lines 22-23, Claim 13, please replace "based on based on" with -- based on --.

Signed and Sealed this
Eighth Day of July, 2025

Coke Morgan Stewart
*Acting Director of the United States Patent and Trademark Office*